(12) United States Patent
Proctor et al.

(10) Patent No.: US 10,095,482 B2
(45) Date of Patent: Oct. 9, 2018

(54) SYSTEMS, METHODS, AND MEDIA FOR GRAPHICAL TASK CREATION

(71) Applicant: MasterCard International Incorporated, Purchase, NY (US)

(72) Inventors: Michael T. Proctor, Saint Charles, MO (US); William J. Watson, Saint Charles, MO (US); Daniel E. Moore, Saint Peters, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 5 days.

(21) Appl. No.: 14/944,896

(22) Filed: Nov. 18, 2015

(65) Prior Publication Data

US 2017/0139680 A1    May 18, 2017

(51) Int. Cl.
*G06F 9/44*    (2018.01)
*G06F 8/30*    (2018.01)
*G06F 8/20*    (2018.01)
*G06F 8/34*    (2018.01)
*G06F 9/50*    (2006.01)

(52) U.S. Cl.
CPC ............ *G06F 8/30* (2013.01); *G06F 8/20* (2013.01); *G06F 8/34* (2013.01); *G06F 9/5027* (2013.01)

(58) Field of Classification Search
CPC ...... G06F 9/4443; G06F 9/45512; G06F 8/34; G06F 8/60; G06F 17/30893
See application file for complete search history.

(56) References Cited

U.S. PATENT DOCUMENTS

| | | | |
|---|---|---|---|
| 6,154,875 A | 11/2000 | Tanaka et al. | |
| 6,763,498 B2 | 7/2004 | Egilsson | |
| 7,581,190 B2 * | 8/2009 | Pintos | G06F 9/4443 715/762 |
| 7,627,833 B2 * | 12/2009 | McKnight | G06F 9/45512 715/780 |
| 2005/0044215 A1 * | 2/2005 | Cohen | H04L 43/12 709/224 |
| 2007/0192748 A1 | 8/2007 | Martin et al. | |

(Continued)

OTHER PUBLICATIONS

Sommermeyer, Katrin, "International Search Report", International Application No. PCT/US2016/061561, dated Mar. 16, 2017, 9 pages.

(Continued)

*Primary Examiner* — Duy Khuong T Nguyen (57) ABSTRACT

Embodiments of the disclosure enable a user to utilize graphical options for a creating a parameterized task. In one aspect, a computer-implemented method and system for task creation and management are provided. An instruction to define a task to define a configurable automation task based on structured data is received. One or more parameter definitions associated with the task are received. A first user interface is generated based on the one or more parameter definitions, through which one or more parameter definition values are received. Based on the instruction, the one or more received parameter definitions, and the one or more received parameter values, a script is generated. A second user interface is configured to integrate the generated script with one or more remote execution capabilities.

20 Claims, 6 Drawing Sheets

(56) References Cited

U.S. PATENT DOCUMENTS

| | | | |
|---|---|---|---|
| 2007/0226259 A1* | 9/2007 | Kacin | G06F 9/45512 |
| 2009/0031226 A1* | 1/2009 | Zhang | G06F 8/34 |
| | | | 715/762 |
| 2009/0037551 A1* | 2/2009 | Gupta | G06F 9/45512 |
| | | | 709/208 |
| 2009/0164988 A1* | 6/2009 | Gupta | G06F 8/60 |
| | | | 717/170 |
| 2010/0037127 A1* | 2/2010 | Tomasic | G06Q 10/06 |
| | | | 715/224 |
| 2010/0229155 A1* | 9/2010 | Adiyapatham | G06F 11/3672 |
| | | | 717/124 |
| 2012/0117569 A1* | 5/2012 | Fogel | G06Q 10/0633 |
| | | | 718/102 |
| 2012/0150939 A1* | 6/2012 | Zaifman | G06F 9/45512 |
| | | | 709/203 |
| 2012/0192069 A1* | 7/2012 | Zhang | G06F 9/45512 |
| | | | 715/704 |
| 2012/0221893 A1* | 8/2012 | Bai | H04L 43/50 |
| | | | 714/27 |
| 2012/0233595 A1 | 9/2012 | Ghanathe | |
| 2014/0123129 A1 | 5/2014 | Risbood | |
| 2015/0229645 A1 | 8/2015 | Keith | |

OTHER PUBLICATIONS

Sommermeyer, Katrin, "Written Opinion", International Application No. PCT/US2016/061561, dated Mar. 16, 2017, 9 pages.

* cited by examiner

SYSTEMS, METHODS, AND MEDIA FOR GRAPHICAL TASK CREATION

FIELD OF DISCLOSURE

The subject matter described herein relates generally to automated task creation and more specifically, to using graphical and/or platform-agnostic parameters to create a task.

BACKGROUND

In computer systems, tasks provide a way for users to set up actions or programs to achieve a desired functionality. Tasks often have parameters, which may include variables that correspond to received information. Through parameterization, it is possible to create robust tasks. Creating tasks has traditionally been performed by technical users that understand how to write programming code to define a task and its parameters. Non-technical users of a system may recognize ways in which a task improves performance of their job functions, or the system overall. However, these non-technical users are typically unable to write the code to create a task and its associated parameters.

SUMMARY

Embodiments of the disclosure enable a script to be generated in a straightforward manner. In one aspect, a computer-implemented method for creating a task is provided. The method includes receiving a configurable automation instruction based on structured data, along with one or more parameter definitions associated with the task. A first user interface is generated based on the one or more parameter definitions. One or more parameter definition values are received. Based on the instruction, the one or more parameter definitions, and the one or more parameter values, a script is generated in accordance with the one or more parameters. A second user interface is configured to integrate the generated script with one or more remote execution capabilities.

In another aspect, a computing device for generating a task is provided. The computing device includes a memory storing data associated with one or more client devices, and computer-executable instructions, and a processor configured to execute the computer-executable instructions. The computer-executable instructions provide for receiving an instruction to define a configurable automation task based on structured data and receiving one or more parameter definitions associated with the task. The computer-executable instructions further provide for generating a first user interface based on the one or more parameter definitions. The computer-executable instructions further provide for receiving one or more parameter definition values. The computer-executable instructions further provide for generating a script to perform one or more operations associated with the task in accordance with the one or more parameters, based on the instruction, the one or more parameter definitions, and the one or more parameter values. The computer-executable instructions further provide for a second user interface configured to integrate the generated script with one or more remote execution capabilities.

In yet another aspect, a computer-readable storage medium having computer-executable instructions embodied thereon is provided. Upon execution by at least one processor, the computer-executable instructions cause the processor to receive an instruction to define a configurable automation task based on structured data, along with one or more parameter definitions associated with the task. The computer-executable instructions further provide generating a user interface based on the one or more parameter definitions and receiving one or more parameter definition values. The computer-executable instructions also provide for generating a script, based on the received instruction, the one or more received parameter definitions, and the one or more received parameter values. The computer-executable instructions also provide a second user interface configured to integrate the generated script with one or more remote execution capabilities.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Embodiments of the disclosure enable a task to be created, exported, and/or managed using information processing, parameterization, and/or graphical task creation. Some embodiments provide for receiving a request for creating a new task at a computing device. The computing device may receive information regarding the task. For example, the computing device may receive information specifying a task type, a task location, and parameter definition information. Some embodiments provide for task creation options to be presented graphically.

Aspects of the disclosure provide for effectively and efficiently creating a task. A task may be any type of parameterized function or program. For example, input from a non-technical user may be received which selects parameters to generate a script without having to code the script. In this manner, the non-technical user may be provided the advantage of configuring or programming a computing device in a way that is far more efficient than having the non-technical user struggle with coding the operations. Moreover, access to the generated script may be provided to other users. The other users that seek to use the script may also be non-technical, and may be provided the ability to utilize the script without having to understand the underlying code. Another aspect provides for specifying one or more remote system endpoints so that the task may be remotely executed, which may involve using management software already present on the remote system endpoint. This in turn may provide for parameterized task execution on the remote endpoint system. Additionally, tasks may be imported and exported, such as in a file. In this manner, the task may be run on remote systems without specialized coding knowledge. A further aspect provides for assigning a task to one or more task groups, where access controls may be assigned to a group and/or individuals in the group. In this manner, a task may be authorized for a group such that, upon transmission of the task to a remote system, access control may be applied to the task on the remote system.

The methods and systems described herein may be implemented using computer programming or engineering techniques including computer software, firmware, hardware or a combination or subset thereof. As described above, at least one technical problem known in task creation systems is how to provide a user with an interface to create a task without the user having to write code. The systems, methods, and media described herein address at least that technical problem. For example, by presenting task creation options, the accuracy of a task creation process may be improved by removing inadvertent coding errors. This, in turn, improves both the efficiency and the accuracy of task creation. Just as important, an incorrectly configured task introduces errors for the users that then use the task. As such, an incorrectly configured task is often worse than no task at all. This is because an incorrect task produces a cascading effect for all the subsequent users of the task, along with having to determine where the errors are occurring. This in turn tends to decrease efficiency and accuracy more than if the task had not been utilized in the first place. Allowing non-technical users to create tasks correctly, the first time, helps ensure smoother system operations not just for the user creating the task, and all subsequent users of the task, but even users who tangentially interact with data utilized by the task.

The technical effect of the systems and processes described herein is achieved by performing at least one of the following operations: a) receiving an instruction to define a configurable automation task based on structured data; b) receiving one or more parameter definitions associated with the task; c) generating a first user interface based on the one or more parameter definitions; d) receiving one or more parameter definition values; e) based on the instruction, the one or more parameter definitions, and the one or more parameter values, generating a script in accordance with the one or more parameters; f) utilizing a second user interface configured to integrate the generated script with one or more remote execution capabilities; g) transmitting, to a first target system of one or more target systems, a first instruction to implement a first operation of the one or more operations; h) generating the script comprises transmitting, to a second target system of the one or more target systems, a second instruction to implement a second operation of the one or more operations; i) generating the script such that the script is configured to access at least one remote data device to retrieve data; j) generating the script such that the script is configured to transmit, to a first target system of one or more target systems, a first instruction to retrieve first data from a first remote data device; k) transmitting, to a second target system of the one or more target systems, a second instruction to retrieve first data from the first remote data device; l) transmitting, to a second target system of the one or more target systems, a second instruction to retrieve first data from a second remote data device; m) identifying at least one target system to perform at least one operation; n) determining whether a return value received from at least one target system satisfies a predetermined threshold, and generate feedback indicative of the determination; o) outputting the one or more parameter definitions as graphical selection choices in the user interface based on a parameter type and a template value associated with a parameter definition; p) comparing a task identifier with a group identifier on at least one or more target systems; q) determining whether a group identifier corresponds to the task identifier and assigning a task permission level; r) determining whether a return value received from at least one target system satisfies a predetermined threshold, and generate feedback indicative of the determination; s) providing access to at least one remote target system of one or more target systems to retrieve data and to transmit, to the at least one remote target system, a first instruction to implement at least one operation; t) transmitting the script to one or more target systems to perform one or more operations associated with the script, and transmitting the script to a second target system of the one or more target systems to perform a second operation associated with the script in accordance with the one or more parameters; u) receive input specifying a task group identifier associated with the script, the task group identifier for comparison with a target group identifier on at least one target system to determine script access based on a comparison of the task group identifier with the target group identifier; v) receiving input corresponding to an operating system or management software of a first target system, and generating the script such that the script is configured according to the operating system or the management software; w) reducing network bandwidth usage due to at least a lower task error rate; x) improved user efficiency via user interface interaction; y) increased user interaction performance; and z) increased speed of task creation.

Figure 1:
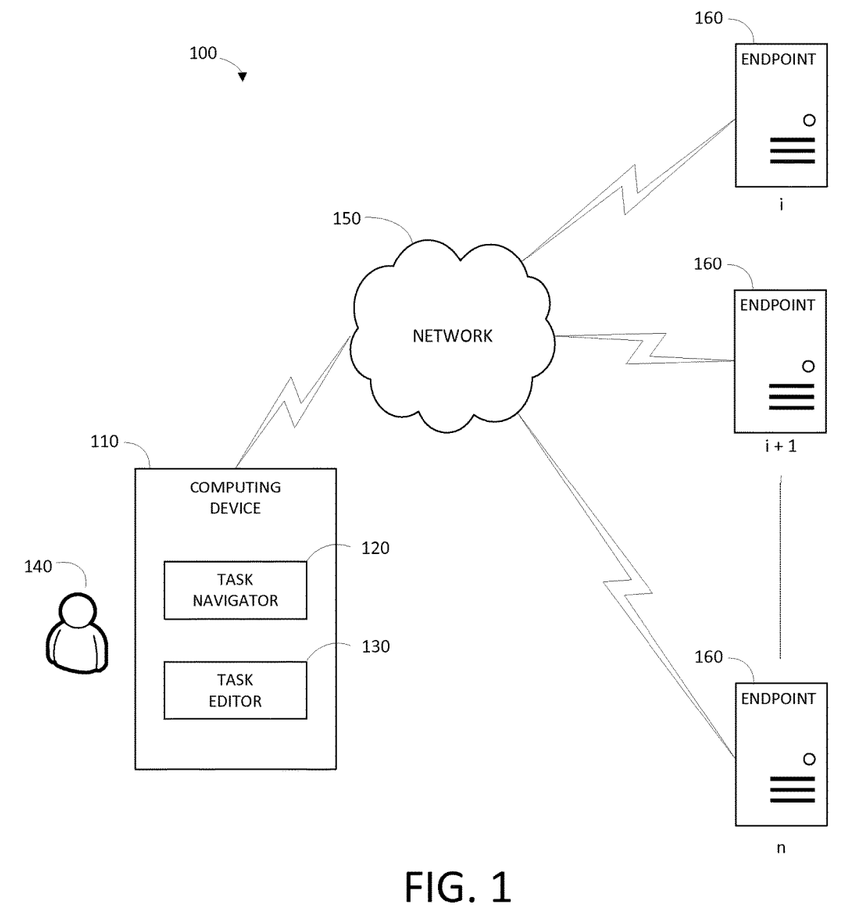
FIG. 1 is a block diagram illustrating an example operating environment.

FIG. 1 is a block diagram illustrating an embodiment of an operating environment 100. The environment 100 includes one or more computing devices 110. The terms "computing system," "computing device," "device," and "computer" may be used interchangeably. Computing device 110 is configured to receive, store, and transmit data (such as user input, task data, script data, operating system data, access control data, etc.) with respect to other computing devices. A task navigator 120 is configured to provide access to one or more tasks stored in the computing device 110. For example, the task navigator 120 may provide an interface for a user to view and/or utilize any available tasks (e.g., a first interface). A task editor 130 may be configured to provide for editing of one or more tasks stored in the computing device 110. For example, the task editor 130 may provide a graphical representation of a task. In some embodiments, the task editor 130 is configured to be text-based (e.g., command line, etc.).

The computing device 110 is configured to receive input from a user 140. A user 140 may, for example, input data into the computing device 110 to utilize the task navigator 120 and/or task editor 130. Computing device 110 may receive data from and/or transmit data to another computing device over a network 150. The network 150 may include a Transmission Control Protocol/Internet Protocol (TCP/IP) infrastructure to facilitate communication over the Internet, although any suitable type of computer network may be utilized.

The environment 100 includes one or more endpoints 160. The terms "endpoint," "remote computing device," "remote computer," "target," "target computer," "target system," and "target device" may be used interchangeably. Any suitable number of endpoints 160 may be accessed from the computing device 110, and multiple endpoints 160 may be accessed simultaneously in some embodiments. Data on endpoints 160 utilized by the computing device 110 may include, for example, access rights, group identifiers, operating system information, configuration data, task data, script data, parameter data, command line data, etc. In other embodiments, this data may be transmitted to the endpoints 160 by the computing device 110 "on demand" at the time the task is executed.

Figure 2:
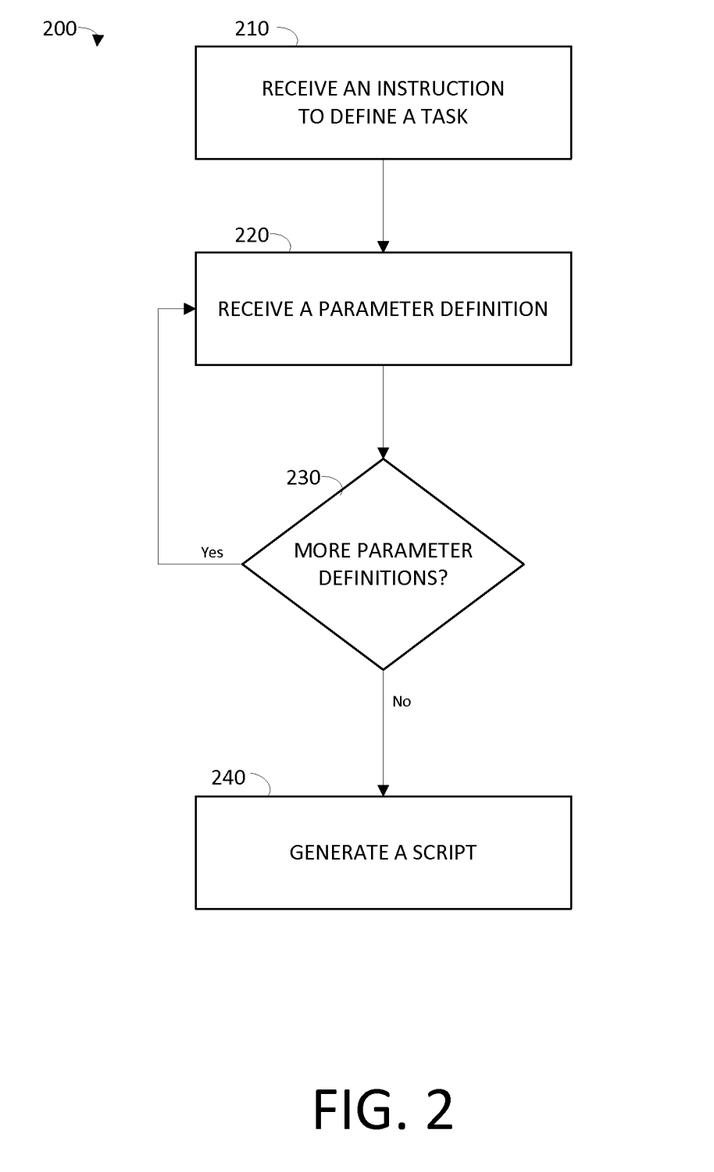
FIG. 2 is a flowchart illustrating an example method for defining a task to generate a script.

FIG. 2 is a flowchart of an embodiment of a method 200 of script generation in a computing device 110 (for example, a server, client, mobile device, etc.). At 210, the computing device 110 receives one or more instructions to define a task. A task may be any type of program or function in a computing system. Task behavior may be defined through a task editor 130. A task may take one of two primary forms: simple or complex. Examples of simple tasks include system commands, application commands, and pre-existing scripts. An example of a simple system command is "uname—a". An example of a simple application command is "service apache2 restart". An example of a custom script stored in a system is "/apps_01/scripts/stopApp.sh". By contrast, complex tasks implement software code which is stored within the computing device 110, rather than on another system.

At 220, the computing device receives a parameter definition. The parameter may be used to receive and store input into a task. Parameter definitions have properties, such as a parameter name (or identifier), a description, a parameter type, a template value, and the like. The parameter name may identify the parameter utilizing any suitable naming convention (such as "$1" for the first parameter of a task, "$2" for the second parameter of a task, etc.). The description may provide information about describing the parameter. The parameter type may be used to generate graphical interface elements such as radio buttons, drop-down lists, checkboxes, text fields, and/or any other suitable graphical input mechanism. Command-line interfaces (input fields, menus, yes/no selections, etc.) may also be utilized. A template value may be determined based on, for example, input received specifying which options are to be displayed as a graphical input mechanism (such as a radio button).

At 230, the computing device checks to see if there are more parameter definitions. In one embodiment, the computing device may receive a predetermined quantity of parameter definitions associated with a task, such as where a task is associated with a predetermined number of parameters. In other embodiments, the quantity of parameters may not be known ahead of time (such as a runtime declaration).

At 240, a script is generated to enable a computing device to perform one or more operations associated with the parameter(s), which are in turn associated with the received task. The script may be performed on the same computing device, such as in the case of a local task. The script may also be performed remotely on one or more endpoints 160 through an interface (e.g., a second user interface), as depicted in the exemplary operating environment of FIG. 1. For example, a received task may have two parameters, a first parameter $1 having a checkbox type and a second parameter $2 having a drop-down list type. Each of these parameters may also have a description associated with it, which may include text appearing near an input field, and/or "alt text" that appears upon hovering a selection mechanism (such as a cursor/pointer utilized by a mouse, finger/limb movement/gesture, eye movement/blink, etc.) over the input field. Each parameter may have one or more template values associated with it. For example, a drop-down list may allow the selection of one of multiple values based on a template value that is a pipe-delimited (|) data set, such as "Option 1|Option 2|Option 3." Any suitable delimiter may be used. Another example would be:

Server_type directory:/apps_01/www|server-directory:/server|Temporary directory:/tmp In this example, the generated script would enable a device to display the options "Server_type directory", "server-directory", and "Temporary directory" and pass respective values "/apps_01/www", "/server", and "/tmp" to the parameter, depending on what is selected. Here, each option/value pair is delimited with a colon, and each option is delimited from other options with a pipe-delimiter. In other embodiments, the values need not be delimited. In some embodiments, the displayed values may differ from parameters passed into the task when the particular displayed value is selected. In some embodiments, the script is performed on a centralized system instead of remotely.

Figure 3:
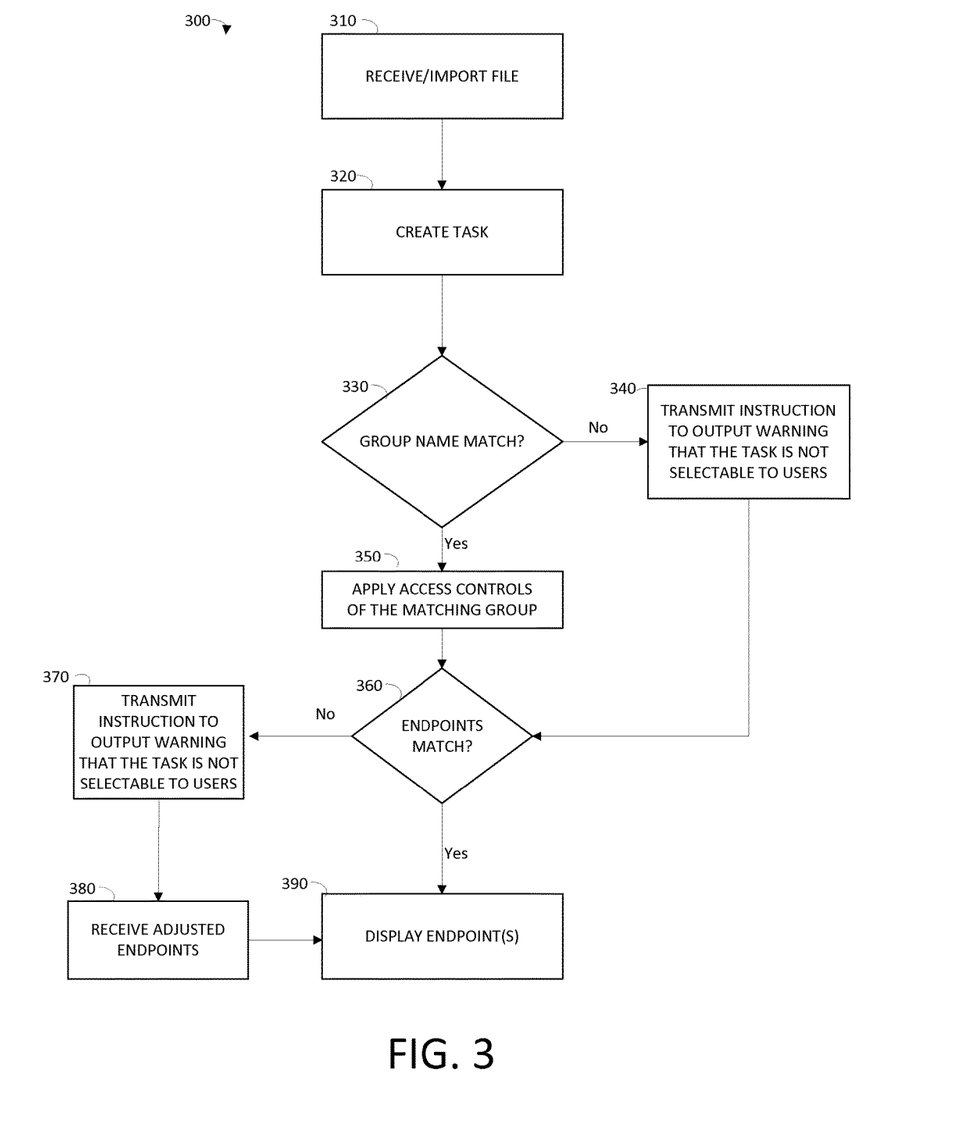
FIG. 3 is a flowchart illustrating an example method for managing a task.

FIG. 3 is a flowchart of an embodiment of a method 300 of task endpoint and group management in a computing device (for example, a server, client, mobile device, etc.). At 310, the computing device receives and/or imports a file. Any suitable type of file may be utilized. The file may be received remotely over any suitable connection, such as over the Internet or other computer network, such as the network 150 shown by way of example in FIG. 1. Alternatively, the file may be received by local delivery, such as a disk or Universal Serial Bus (USB) storage device.

At 320, a new task is created. The new task may be based on the received/imported file, but may also already reside in the computing system. The new task is generated based on the associated parameters stored within the file. Another property of a task is task permissions. Permissions control, for example, the types of access one may have with respect to a particular type of task. Types of permissions include read-only and executable access to run the task. Another type of permission is administrative, which provides a user with rights to manage and/or edit the task, as well as manage access for other users and/or groups, as explained below. Another type of access includes auditor access, which allows a user to view other users' historical task execution, which may (but need not necessarily) apply across all tasks accessed by a particular user and/or all users associated with a task.

Users may belong to one or more groups of users. Membership in one or more groups may be mandatory or optional. Some embodiments do not utilize groups. Different embodiments may restrict users to one group, whereas other embodiments permit membership in multiple groups. Group membership may be granted on the basis of current access rights level, and/or being granted membership by a user belonging to the group (either of which may be revocable in some embodiments). Group membership may be time-limited and/or contingent upon satisfying one or more criteria, and may include the revocation of membership upon expiration of a time period and/or violating a criterion. Exceptions may also be provided, such that one or more individuals may be excluded from accessing (or having other varying access rights to) a task to which the group (of which such member) is provided access. Conversely, members may be provided access (or varying access rights) to tasks even though their group membership does not, on its own, afford such access.

A task may be associated with one or more groups. At 330, an identifier of a group (such as a group name) associated with the task is compared to one or more group names associated with the computing system. The comparison determines the permissions afforded to the user (e.g., read-only access, executable access, audit access). The comparison may be exact, or probability/similarity-based. As discussed above, the task navigator 120 may provide an interface for a user to view and/or utilize any tasks available to the user. If the group name associated with the received/ imported task does not match at least one group name associated with the receiving computing device, a warning message may be transmitted in order to output the warning message at 340 stating that the task is not selectable to users with respect to the receiving computing device. The group name associated with the received/imported task is compared to at least one group name associated with the receiving computing system. In some embodiments, tasks and groups may be associated within a central system. Other embodiments may associate tasks and groups remotely.

At 350, if the comparison results in a match, the access controls associated with the matching group name are applied to the task. A task may have one or more targets (e.g., the subject of the operations of the task) that are local, remote, or both. A local task includes one or more operations that stay within the same computing system. That is, a local task does not perform one or more operations that affect another computing system. For example, a local task on a server may be used to maintain the server itself. By contrast, a remote task performs one or more operations that affect another computing system. A remote task includes one or more endpoints that specify one or more location(s) of one or more remote systems with which the computing device containing the task interacts. Some embodiments allow a task to run on multiple endpoints at once. If the task is being exported, the endpoint may be exported as part of the export file. An endpoint may be a Universal Resource Locator (URL), Uniform Resource Identifier (URI), a network path, or any other suitable way to represent the location of a remote location and/or system. A task may also be both remote and local, such as having target locations on remote computing devices along with target locations on the receiving computing device.

One or more endpoints may be output to a user as choices in a graphical user interface, and received as input upon selection by the user. For example, a user selects a target operating system (UNIX® brand operating system, LINUX® brand operating system, WINDOWS® brand operating system) and the type of remote access mechanism available on the target system (IBM® Tivoli® brand network monitoring software, ZABBIX® brand network monitoring software, SSH® brand remote access protocol, etc.) for integration in running commands on the remote system (UNIX is a registered trademark of X/Open Company Limited Corporation, LINUX is a registered trademark of Linus Torvalds, WINDOWS is a registered trademark of Microsoft Corporation, IBM and Tivoli are registered trademarks of International Business Machines Corporation, ZABBIX is a registered trademark of Zabbix SIA Limited Liability Company, and SSH is a registered trademark of SSH Communications Security Corporation). Some embodiments allow a user to specify and/or modify the requirements associated with the operating system and/or remote access mechanism for integration in running commands on the remote system.

Tasks may be configured to allow endpoints to be entered in a free-form manner (e.g., manually-entered text), rather than selected from predefined endpoints. For example:

Modify Task Id 123 Set Flag any_Endpoint

Some free-form input for endpoints may pose a security risk, and require authentication and/or confirmation. Input may be received that designates a task as a potential security risk. For example:

Modify Task Id 123 Set Flag Dangerous

At 360, an endpoint specified in the file is compared to one or more endpoints associated with the receiving computing device. If the endpoint specified in the file do not match one or more endpoints associated with the receiving computing device (e.g., based on operating system type, location of the remote system, etc.), then the receiving computing device may transmit or otherwise return an instruction that provides a warning that the task is not selectable to users on the receiving system at 370. At 380, adjusted endpoints may be received. For example, a user with sufficient privileges (such as administrator privileges with respect to the instant task) may modify one or more endpoints in the task, so that the endpoints specified in the file match or correspond to one or more endpoints associated with the receiving computing device.

On the other hand, if the endpoint specified in the file matches one or more endpoints associated with the receiving computing device, the endpoint may be displayed at 390 to a user utilizing the task. If the file contains both matching and non-matching endpoints, the matching endpoints may be made available to users of the receiving computer system, while generating and/or presenting a warning for the non-matching endpoints.

In some embodiments, execution of a task, whether local or remote, may result in a return code to determine success or failure. A task results page or data structure may be used to indicate the result. For example, as shown in Table 1 (below), a return code of 0 may be interpreted, for example by a computing device or a user, as a success. By contrast, a return code of a value including and between 100 and 249 may be interpreted as a warning, and any other return code may be interpreted as a failure.

TABLE 1

| Return Code Ranges | |
|---|---|
| 0 | Success |
| 1 to 99 | Failure |
| 100 to 249 | Warning |
| 250 to 255 | Failure |

Along with importing/receiving a file, a computing device may send, export, and/or upload a task as a file. For example, a user may select an export icon through any type of suitable interface, such as a graphical user interface (e.g., creation wizard, etc.). Other embodiments may provide a command-line interface. This export process may traverse the data associated with the task to be exported, capturing one or more linked data elements and one or more items of uploaded content referenced within the linked data elements. The user may then be provided with a file that includes some or all of these elements, wherein the user may then be prompted to save the file, or the file may be immediately downloaded to a location specified by the system and/or the user.

Figure 4:
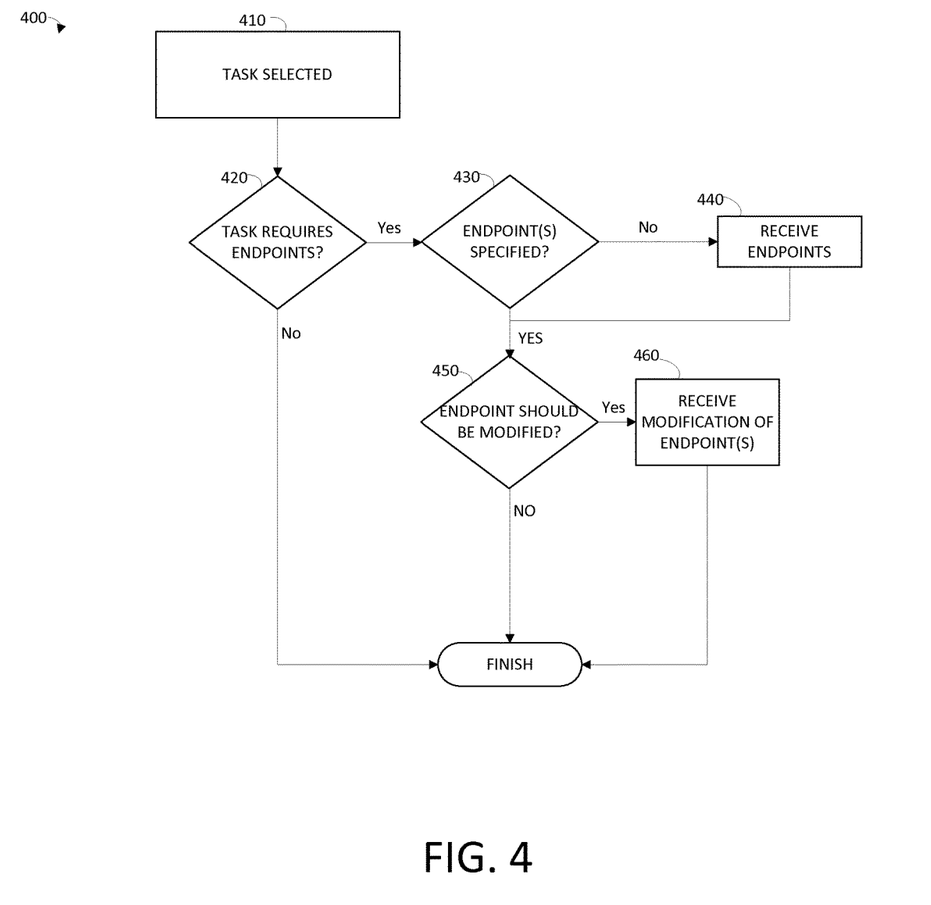
FIG. 4 is a flowchart illustrating an example method for managing task endpoints.

FIG. 4 is a flowchart of an embodiment of a method 400 of remote task management in a computing device (for example, a server, client, mobile device, etc.). In some embodiments, remote task management may utilize a plug-in interface for integration with remote execution capabilities common in existing monitoring and provisioning tools. The plug-in interface may be completely or partially platform agnostic. The plug-in interface may be run, for example, from any Internet browser.

Figure 5:
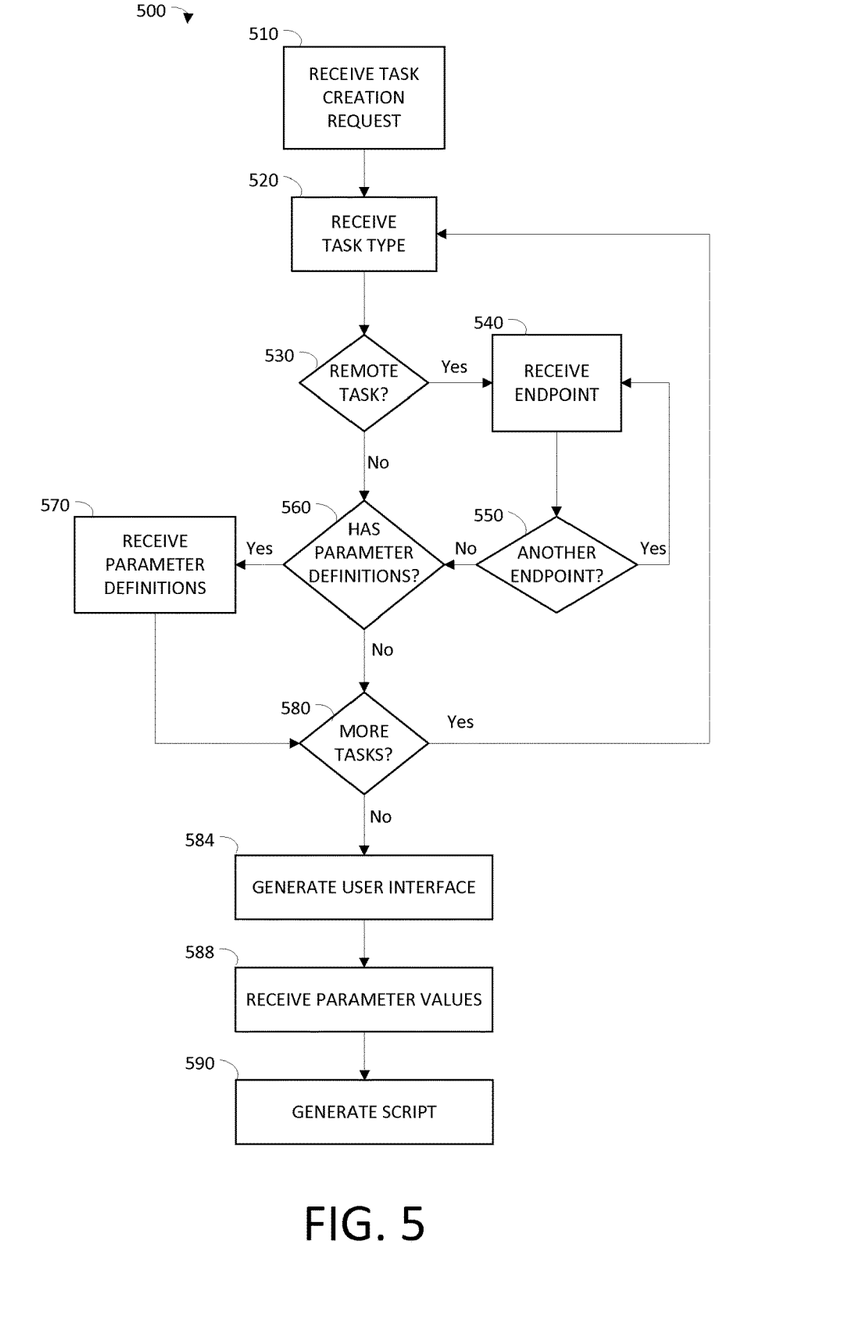
FIG. 5 is a flowchart illustrating an example method for creating a task.

At 410, the computing device receives input selecting a task. At 420, the task is analyzed to determine whether one or more endpoints are required for the task to interact with another computing device. If the task requires one or more endpoints, then at 430 the task is checked for endpoints (e.g., it is determined whether one or more endpoints are specified). If the task (or file) does not include (or is missing) an endpoint, then the user may be prompted to provide one or more endpoints, wherein one or more endpoints are received at 440. At 450, one or more endpoints may be checked for validity (e.g., it is determined whether endpoint should be modified). If, for example, an endpoint has a path or an operating system that is not compatible with a target system to which the endpoint is referring, then modification may be required. At 460, the computing device may then prompt a user to provide a modification to the endpoint and/or one or more modified/updated endpoints or, alternatively, the computing device may dynamically update the endpoints based upon the current path and/or operating system information (for example) which may be utilized to determine the endpoint. FIG. 5 is a flowchart of an embodiment of a method 500 of task creation in a computing device (for example, a server, client, mobile device, etc.). At 510, the computing device receives a task creation request. At 520, the computing device receives a task type. At 530, a determination is made as to whether the task is a remote task. If the task is determined to be a remote task, then the computing device may prompt a user to provide endpoints, and receive an endpoint at 540. At 550, it is checked to determine whether there is another endpoint not yet considered. If it is determined that there is another endpoint, the endpoint is received at 540. This process may be repeated until each endpoint has been received. If the task is a local task (e.g., a task that is not associated with an endpoint), or once the endpoints have been received, then the computing device determines if the task has one or more parameters at 560.

The computing system receives one or more parameter properties at 570. For example, the computing system may receive a parameter name/id (such as $1), a parameter description (such as descriptive text), a parameter type (such as a drop-down list), and/or a template value (such as multiple-choice selection options). At 580, once the parameter properties have been received, it is determined if there are additional tasks not yet considered. If it is determined that there are more tasks at 580, then at 520 another task is received. At 584, once the tasks have been processed, a user interface is generated. At 588, the user interface may receive input specifying parameter values. The parameter values may be received from a user, which may be different from the user providing the parameter definitions. At 590 a script may be generated based upon the received parameter values.

Figure 6:
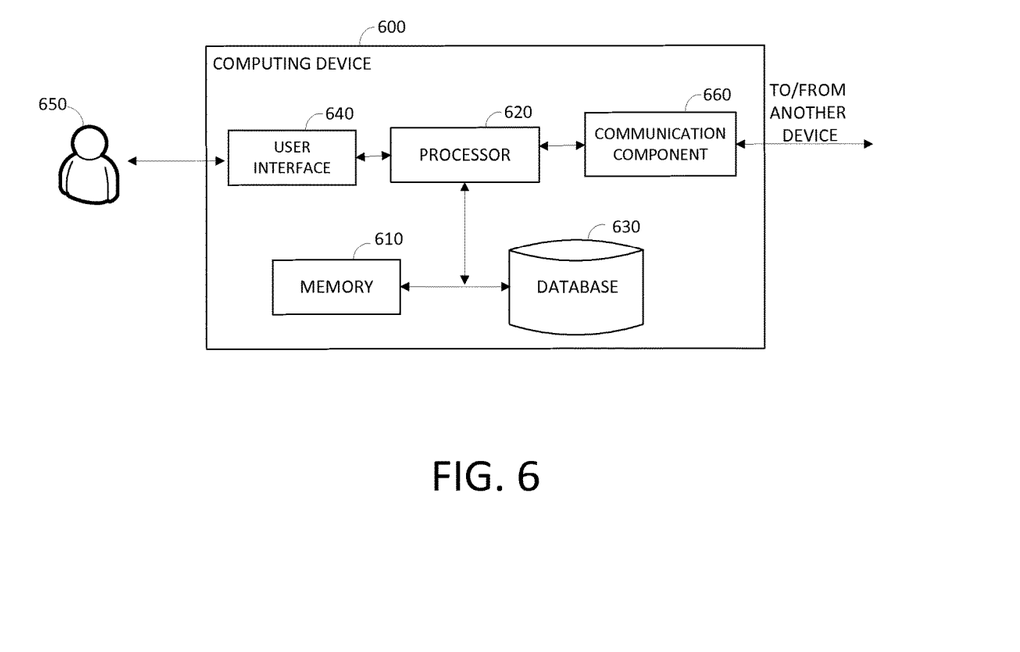
FIG. 6 is a block diagram illustrating an example computing device.

FIG. 6 is a block diagram illustrating an example computing device 600 that may be representative of one or more devices performing actions in any of the flowcharts (shown in FIGS. 2-5). While some embodiments of the disclosure are illustrated and described herein with reference to the computing device 600 being a computing device, aspects of the disclosure are operable with any computing device that executes instructions to implement the operations and functionality associated with the computing device 600.

For example, the computing device 600 may include a mobile device, a mobile telephone, a phablet, a tablet, a client device, a server device, a gaming device, a portable media player, a netbook, a laptop, a desktop computer, a computing pad, a kiosk, a tabletop device, an industrial control device, and other computing devices. The computing device 600 may represent a group of processing units or other computing devices. Additionally, any computing device described herein may be configured to perform any operation described herein including one or more operations described herein as being performed by another computing device.

The computing device 600 includes one or more computer-readable media, such as a memory 610 storing computer-executable instructions, message data, security data, parameter data, and other data, and one or more processors 620 programmed to execute the computer-executable instructions for implementing aspects of the disclosure. The memory 610 includes any quantity of media associated with or accessible by the computing device 600. The memory 610 may be internal to the computing device 600 (as shown in FIG. 6), external to the computing device 600 (not shown), or both (not shown).

The processor 620 includes any quantity of processing units, and the instructions may be performed by the processor 620 or by multiple processors within the computing device 600 or performed by a processor external to the computing device 600. The processor 620 is programmed to execute instructions such as those illustrated in the figures (e.g., FIGS. 1, 2, 3, 4, and/or 5). Although the processor 620 is shown separate from the memory 610, embodiments of the disclosure contemplate that the memory 610 may be onboard the processor 620 such as in some embedded systems.

Upon programming or execution of these instructions, the processor 620 is transformed into a special purpose microprocessor or machine. For example, instructions in the computing device 600, when executed by the processor 620, cause the processor 620 to receive an instruction, receive one or more parameters, and/or generate a script.

In some examples, instructions in a computing device 600, when executed by the processor 620, causes the processor 620 to receive a file, create a new task, apply access controls that match a group stored on the computing device 600, and adjusts endpoints for a task whose group name matches a group stored on the computing device 600. Various examples include instructions in a computing device 600, that when executed by the processor 620, cause the processor 620 to export a task as a file to a different instance, where endpoints are specified and/or modified. Several examples include instructions in a computing device 600, when executed by the processor 620, causes the processor 620 to receive a task creation request along with a task type, receiving endpoints for a remote task, and receive parameter name/id, description, type, and value data for a scripted task. Although the processor 620 is shown separate from the memory 610, embodiments of the disclosure contemplate that the memory 610 may be onboard the processor 620 such as in some embedded systems.

The computing device 600 includes at least one database 630. Any type of database, such as centralized, decentralized, distributed, remote, cloud-based, etc., may be utilized. Any type of data may be stored and retrieved, for example, a task at 110 (as shown in FIG. 1) and/or a task type at 420 (as shown in FIG. 4). The database 630 may reside within the memory 610, outside the memory 610 within the computing device 600, or outside the computing device 600. In one example, in a computing device 600, a request from another computing device (not shown) may be received by the communication interface device 640, executed by the processor 620 as a query upon the database 630, whereupon the processor 620 may instruct the communication interface device 640 to send the query results back to the requesting computing device and/or any other device.

The computing device 600 includes at least one user interface 640 for exchanging data between the computing device 600 and a user 650. For example, the user interface 640 includes or is coupled to a presentation device configured to present information, such as text, images, audio, video, graphics, alerts, and the like, to the user 650. The terms "user interface" and "user interface device" may be used interchangeably. The presentation device may include, without limitation, a display, a speaker, or a vibrating component. Additionally or alternatively, the user interface 640 may include or be coupled to an input device (not shown) configured to receive information, such as user commands, from the user 650. The input device may include, without limitation, a controller, a camera, a microphone, or an accelerometer. In at least some embodiments, the presentation device and the input device are integrated in a common user interface 640 configured to present information to the user 650 and receive information from the user 650. For example, the user-interface device may include, without limitation, a capacitive touch screen display or a controller including a vibrating component. In some embodiments, the user 650 may interface with the computing device 600 via another computing device.

The computing device 600 includes at least one communication component 660 for exchanging data between the computing device 600 and a computer-readable media or another computing device. Communication between the computing device 600 and a computer-readable media or another computing device may occur using any protocol or mechanism over any wired or wireless connection. In some examples, the communications interface component includes a network interface card and/or computer-executable instructions (e.g., a driver) for operating the network interface card. Communication between the computing device and other devices may occur using any protocol or mechanism over any wired or wireless connection. In some examples, the communications interface is operable with short range communication technologies such as by using near-field communication (NFC) tags, wireless networks (such as wireless fidelity), and/or cellular networks.

The block diagram of FIG. 6 is merely illustrative of an example system that may be used in connection with one or more embodiments of the disclosure and is not intended to be limiting in any way. Further, peripherals or components of the computing devices known in the art are not shown, but are operable with aspects of the disclosure. At least a portion of the functionality of the various elements in FIG. 6 may be performed by other elements in FIG. 6 or an entity (e.g., web service, applications, etc.) not shown in FIG. 6.

Although described in connection with an example computing system environment, embodiments of the disclosure are capable of implementation with numerous other general purpose or special purpose computing system environments, configurations, or devices.

Example computer-readable media and/or computer-readable devices include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this disclosure are not signals per se. Example computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Embodiments of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, earphones, and the like), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Embodiments of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. Furthermore, references to an "embodiment" or "example" of the present disclosure are not intended to be interpreted as excluding the existence of additional embodiments or examples that also incorporate the recited features. The terms "comprising," "including," and "having" are intended to be inclusive and mean that there may be additional elements other than the listed elements. The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

In some embodiments, the operations illustrated in the drawings may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The examples illustrated and described herein as well as examples not specifically described herein but within the scope of aspects of the disclosure constitute exemplary means for task creation. For example, the elements illustrated in FIGS. 1 and 6, such as when encoded to perform the operations illustrated in FIGS. 2-5, constitute exemplary means for receiving an instruction to define a task, exemplary means for receiving one or more parameters associated with the task, and exemplary means for generating a script that is executable on one or more target systems to perform one or more operations associated with the task in accordance with the one or more parameters.

While the aspects of the disclosure have been described in terms of various embodiments with their associated operations, a person skilled in the art would appreciate that a combination of operations from any number of different embodiments is also within scope of the aspects of the disclosure.

What is claimed is:

1. A method comprising:
   receiving, by a computing device, a first instruction to define a configurable automation task based on structured data;
   applying access controls to the configurable automation task that match a group stored on the computing device;
   adjusting one or more remote target systems in the configurable automation task based on the group stored on the computing device;
   upon determining that the configurable automation task is at least partly a remote task rather than a local task, obtaining data relating to a first remote target system of the one or more remote target systems associated with the configurable automation task;
   upon determining that the obtained data relating to the first remote target system of the one or more remote target systems matches data of at least one target system of target systems associated with the computing device, receiving one or more parameter types and parameter definitions associated with the configurable automation task;
   generating, by a processor, a first user interface based on the received one or more parameter types and parameter definitions;
   receiving one or more parameter definition values via the generated first user interface;
   generating, by the processor, a script based on the received first instruction, the received one or more parameter definitions, and the received one or more parameter definition values;
   transmitting the generated script to the first remote target system to perform a first operation of one or more operations associated with the configurable automation task in accordance with the received one or more parameter definitions, and the received one or more parameter definition values; and
   utilizing, by the processor, a second user interface configured to integrate the generated script with one or more remote execution capabilities of the one or more remote target systems by transmitting, to a second remote target system of the one or more remote target systems, a second instruction to perform a second operation of the one or more operations associated with the configurable automation task, the second operation being different from the first operation.

2. The method of claim 1, wherein the second user interface is platform agnostic.

3. The method of claim 1, wherein generating the script comprises generating the script such that the script is configured to access at least one remote data device to retrieve data.

4. The method of claim 1, wherein generating the script comprises generating the script such that the script is configured to transmit, to a first target system of the one or more remote target systems, a third instruction to retrieve first data from a first remote data device.

5. The method of claim 4, wherein utilizing the second interface comprises transmitting, to the second remote target system of the one or more remote target systems, a fourth instruction to retrieve second data from the first remote data device.

6. The method of claim 5, wherein utilizing the second interface comprises transmitting, to the second remote target system of the one or more remote target systems, a fifth instruction to retrieve third data from a second remote data device.

7. The method of claim 1, wherein generating the first user interface comprises generating graphical interface elements associated with the parameter definitions based on the parameter types of the parameter definitions.

8. The method of claim 1, wherein utilizing the second interface comprises determining whether a return value received from at least one target system satisfies a predetermined threshold, and generating feedback indicative of the determination.

9. The method of claim 1, wherein generating the script comprises outputting the one or more parameter definitions as graphical selection choices in the first interface based on the parameter type and a template value associated with a parameter definition.

10. The method of claim 1, wherein the method further comprises:
    receiving input specifying a task group identifier associated with the script, the task group identifier for comparison with a target group identifier on at least one target system to determine script access based on the comparison.

11. A computing device for generating a task, the computing device comprising:
    a memory storing data associated with one or more client devices, and computer-executable instructions; and
    a processor configured to execute the computer-executable instructions to:
      receive, by the computing device, a first instruction to define a configurable automation task based on structured data;
      apply access controls to the configurable automation task that match a group stored on the computing device;
      adjust one or more remote target systems in the configurable automation task based on the group stored on the computing device;
      upon determining that the configurable automation task is at least partly a remote task rather than a local task, obtain data relating to a first remote target system of the one or more remote target systems associated with the configurable automation task;

upon determining that the obtained data relating to the first remote target system of the one or more remote target systems matches data of at least one target systems associated with the computing device, receive one or more parameter types and parameter definitions associated with the configurable automation task;

generate a first user interface based on the received one or more parameter definitions and one or more parameter types;

receive one or more parameter definition values via the generated first user interface;

generate a script based on the received first instruction, the received one or more parameter definitions, and the received one or more parameter definition values;

transmit the generated script to the first remote target system to perform a first operation of one or more operations associated with the configurable automation task in accordance with the received one or more parameter definitions, and the received one or more parameter definition values; and utilize a second user interface configured to integrate the generated script with one or more remote execution capabilities of the one or more remote target systems by transmitting, to a second remote target system of the one or more remote target systems, a second instruction to perform a second operation of the one or more operations associated with the configurable automation task, the second operation being different from the first operation.

12. The computing device of claim 11, wherein the second user interface is platform agnostic.

13. The computing device of claim 11, wherein the processor is further configured to execute the computer-executable instructions to present one or more template values as one or more graphical selection choices.

14. The computing device of claim 11, wherein the processor is further configured to execute the computer-executable instructions to determine whether a return value received from at least one remote target system of the one or more remote target systems satisfies a predetermined threshold, and generate feedback indicative of the determination.

15. The computing device of claim 11, wherein the processor is further configured to provide access to at least one remote target system of the one or more remote target systems to retrieve data and to transmit, to at least one remote target system of the one or more remote target systems, a third instruction to implement at least one operation.

16. A computer-readable storage medium having computer-executable instructions embodied thereon, wherein, upon execution by at least one processor, the computer-executable instructions cause the processor to:

receive, by a computing device, a first instruction to define a configurable automation task based on structured data;

apply access controls to the configurable automation task that match a group stored on the computing device;

adjust one or more remote target systems in the configurable automation task based on the group stored on the computing device;

upon determining that the configurable automation task is at least partly a remote task rather than a local task, obtain data relating to a first remote target system of the one or more remote target systems associated with the configurable automation task;

upon determining that the obtained data relating to the first remote target system of the one or more remote target systems matches data of at least one target system of target systems associated with the computing device, receive one or more parameter types and parameter definitions associated with the configurable automation task;

generate a first user interface based on the received one or more parameter definitions and the received one or more parameter types;

receive one or more parameter definition values via the generated first user interface;

based on the received first instruction, the one or more received parameter definitions, and the one or more received parameter values, generating a script;

transmit the generated script to the first remote target system to perform a first operation of one or more operations associated with the configurable automation task in accordance with the received one or more parameter definitions, and the received one or more parameter definition values; and utilize a second user interface configured to integrate the generated script with one or more remote execution capabilities of the one or more remote target systems by transmitting, to a second remote target system of the one or more remote target systems, a second instruction to perform a second operation of the one or more operations associated with the configurable automation task, the second operation being different from the first operation.

17. The computer-readable storage medium of claim 16, wherein, upon execution by the at least one processor, the computer-executable instructions further cause the processor to transmit the script to a third target system of the one or more remote target systems to perform a third operation associated with the script in accordance with the one or more parameters.

18. The computer-readable storage medium of claim 16, wherein, upon execution by the at least one processor, the computer-executable instructions further cause the processor to:

receive input specifying a task group identifier associated with the script, the task group identifier for comparison with a target group identifier on at least one target system to determine script access based on a comparison of the task group identifier with the target group identifier.

19. The computer-readable storage medium of claim 16, wherein, upon execution by the at least one processor, the computer-executable instructions further cause the processor to:

receive input corresponding to an operating system or management software of the first target system of the one or more remote target systems; and generate the script such that the script is configured according to (i) the operating system, (ii) the management software, or both.

20. The computing device of claim 11, wherein the processor is further configured to execute the computer-executable instructions to receive input specifying a task group identifier associated with the script, the task group identifier for comparison with a target group identifier on at least one target system to determine script access based on the comparison.

* * * * *